F. A. HOWARD.
RIVET TESTER.
APPLICATION FILED MAR. 19, 1920.
1,371,484. Patented Mar. 15, 1921.
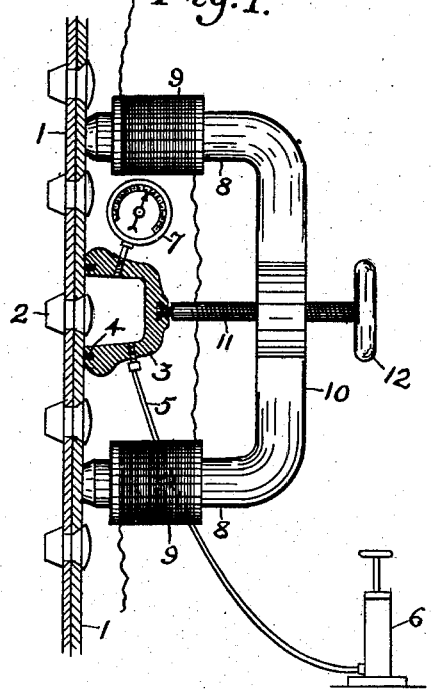
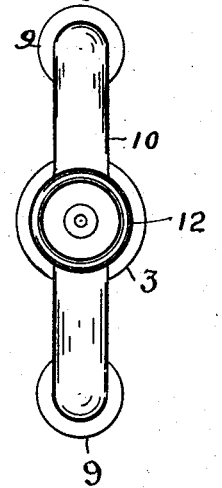
Inventor:
Frank A. Howard
by S. W. Bates
Atty.

UNITED STATES PATENT OFFICE.

FRANK A. HOWARD, OF PORTLAND, MAINE.

RIVET-TESTER.

1,371,484.  Specification of Letters Patent.  Patented Mar. 15, 1921.

Application filed March 19, 1920. Serial No. 367,289.

*To all whom it may concern:*

Be it known that I, FRANK A. HOWARD, a citizen of the United States, residing at 34 Portland Pier, Portland, in the county of Cumberland and State of Maine, have invented certain new and useful Improvements in Rivet-Testers, of which the following is a specification.

My invention relates to a device for testing bolts, rivets, and the like where the latter are used for riveting iron or steel plates together in ships or other structures where it is necessary to make a tight joint.

The invention particularly is designed for testing rivets in the hulls of steel vessels at the sides of the vessels and above the water line.

The device consists esesntially of a tight cup for covering the head of the rivet or bolt and making a tight connection with the riveted plate with an electro-magnet for holding the cup in tight contact with the plate so as to resist the internal pressure from the testing fluid which is injected into the cup as a means for testing the tightness of the rivet joints.

In the accompanying drawings I have illustrated the preferable form of my invention.

In the drawing:

Figure 1 shows a side elevation of the device as applied to the side plates of a ship with the cup in section and, Fig. 2 is an elevation.

Referring to the drawing:

1—1 represents the steel or iron plates of the ship or other structure united by the rivets 2 which are to be tested one at a time for the purpose of finding any leaky rivet.

The testing device consists of a cup 3 sufficiently large to close the head of the rivet and having a gasket 4 inserted in the lower end of the cup for making a tight joint with the plate 1.

Testing fluid usually water is pumped into the interior of the cup 3 through a pipe connection 5 from a suitable hydraulic pump indicated at 6 and the pressure thus pumped up within the cup is indicated by a pressure gage 7 in the usual way.

The cup is held against the steel or iron plate with sufficient force to resist the testing pressure developed within the interior of the cup.

For this purpose I make use of an electromagnet, the core of which is formed of a yoke adapted to connect with and exert pressure upon the cup 3 when the electric current is passed through the magnet.

As here shown, I make use of a pair of magnets 9 each of which has a core 8 joined by a connecting bar 10; this yoke embraces and straddles the cup 3 and the yoke and cup are connected by screw 11 which passes through the yoke, its inner end making a connection with the cup 3 in any suitable manner.

The handle 12 is provided for forcing the screw more or less against the cup in order to regulate the pressure between the yoke and the cup, the connection between the inner end of the screw and the top portion of the cup is sufficiently loose so that there will be no binding effect if there is not perfect alinement.

In actual practice the device is carried on a scow alongside the vessel, the cup is applied over the rivets to be tested one after the other, an electric current is turned on to energize the magnet and the testing fluid is admitted to the interior of the cup through the connecting holes 5.

As soon as the pressure gage indicates that there is no leak the device is removed and applied to the next rivet in the same manner and in this way rivets may be tested with great rapidity.

It is to be understood that the device is designed for testing nuts, screws, bolts, rivets or any like connections used to join steel or iron plates where it is necessary to surround the joint with water or other fluid under pressure for the purpose of detecting leakage.

The pressure, of course, of the fluid within the cup must not be sufficient to overcome the attraction of the magnet but this is readily provided for without making the magnets of unusual size since the diameter of the cup being but a little larger than the bolt or rivet will have a relatively small amount of surface to be acted upon by the testing fluid.

It is also to be understood that the device may be used in any situation where steel or iron plates are secured together by bolts, rivets, or the like and where it is desired to test the tightness of the joint.

I claim:—

1. A device for testing joints of rivets and the like in steel or iron plates consisting of a cup fitting over the head of the rivet and making a tight joint with said plate, a yoke for holding said cup in position, an electro-magnet on said yoke for forcing the cup against the plate and an adjusting screw for regulating the pressure between the yoke and the cup.

2. A device for testing joints of rivets and the like in steel or iron plates consisting of a cup fitting over the head of the rivet and making a tight joint with the plate, a yoke extending over the cup and having an electro-magnet at each end for holding the yoke in position and adjusting screw extending through said yoke and engaging said cup for adjusting the pressure between said yoke and said cup.

3. A device for testing joints of rivets and the like in steel or iron plates consisting of a cup fitting over the head of the rivet and making a tight joint with the plate, a pair of electro-magnets, a core for each magnet, a yoke connecting said cores and an adjusting device connecting said core to the cup for regulating the pressure between the cup and yoke.

4. A device for testing the joints of rivets and the like, in steel and iron plates consisting of a cup fitting over the head of the rivet and making a relatively tight joint with the plate, an electro-magnet for holding the cup in contact with the plate and means for regulating the pressure between the magnet and the cup.

In testimony whereof I have affixed my signature.

FRANK A. HOWARD.